(12) United States Patent
Sheridan

(10) Patent No.: US 8,900,083 B2
(45) Date of Patent: *Dec. 2, 2014

(54) FAN DRIVE GEAR SYSTEM INTEGRATED CARRIER AND TORQUE FRAME

(75) Inventor: William G. Sheridan, Southington, CT (US)

(73) Assignee: United Technologies Corporation, Hartford, CT (US)

( * ) Notice: Subject to any disclaimer, the term of this patent is extended or adjusted under 35 U.S.C. 154(b) by 805 days.

This patent is subject to a terminal disclaimer.

(21) Appl. No.: 13/095,324

(22) Filed: Apr. 27, 2011

(65) Prior Publication Data

US 2012/0272762 A1 Nov. 1, 2012

(51) Int. Cl.
*F16H 57/04* (2010.01)
*F02C 7/36* (2006.01)
*F02K 3/06* (2006.01)

(52) U.S. Cl.
CPC .......... *F02C 7/36* (2013.01); *F05D 2260/40311* (2013.01); *Y02T 50/672* (2013.01); *F02K 3/06* (2013.01)
USPC .......................................... 475/160; 475/331

(58) Field of Classification Search
USPC .................... 475/159, 160, 331, 346
See application file for complete search history.

(56) References Cited

U.S. PATENT DOCUMENTS

| | | | |
|---|---|---|---|
| 2,281,875 A * | 5/1942 | Gleissner | 38/44 |
| 2,749,778 A * | 6/1956 | Kuhn | 475/347 |
| 3,227,006 A * | 1/1966 | Bowen, Jr. | 475/347 |
| 3,257,869 A * | 6/1966 | Sharples | 475/347 |
| 3,352,178 A * | 11/1967 | Lindgren et al. | 475/343 |
| 3,635,103 A * | 1/1972 | Monti | 475/346 |
| 5,102,379 A | 4/1992 | Pagluica et al. | |
| 5,391,125 A | 2/1995 | Turra et al. | |
| 5,433,674 A | 7/1995 | Sheridan et al. | |
| 5,466,198 A * | 11/1995 | McKibbin et al. | 475/346 |
| 6,223,616 B1 | 5/2001 | Sheridan | |
| 6,663,530 B2 | 12/2003 | Poulin et al. | |
| 7,033,301 B2 * | 4/2006 | Kimes | 475/340 |
| 7,220,057 B2 * | 5/2007 | Hoppe | 384/280 |
| 7,223,197 B2 | 5/2007 | Poulin et al. | |
| 7,704,178 B2 | 4/2010 | Sheridan et al. | |
| 7,883,439 B2 | 2/2011 | Sheridan et al. | |
| 2010/0105516 A1 | 4/2010 | Sheridan et al. | |
| 2010/0154217 A1 | 6/2010 | Sheridan et al. | |
| 2010/0247015 A1 | 9/2010 | Montagu et al. | |
| 2012/0277055 A1 * | 11/2012 | Sheridan | 475/331 |

OTHER PUBLICATIONS

U.S. Appl. No. 12/644,848, filed Dec. 22, 2009 entitled, "Coupling System for a Star Gear Train in a Gas Turbine Engine".
U.S. Appl. No. 12/902,525, filed Oct. 12, 2010 entitled, "Planetary Gear System Arrangement With Auxiliary Oil System".
Vibration Monitoring of UH-60A Main Transmission Planetary Carrier Fault by Jonathan A. Keller and Paul Grabill presented at the American Helicopter Society 59th Annual Forum, Phoenix, Arizona, May 6-8, 2003, Copyright 2003 by the American Helicopter Society International, Inc. (11 pages).

* cited by examiner

*Primary Examiner* — Justin Holmes
(74) *Attorney, Agent, or Firm* — Carlson, Gaskey & Olds, P.C.

(57) ABSTRACT

A fan gear drive system includes a torque frame having a base with integrated gear shafts circumferentially spaced relative to one another. Each shaft provides a shaft axis. A bearing assembly is mounted on each of the gear shafts and provides a bearing assembly. The bearing assembly includes a spherical bearing configured to permit angular movement of the bearing axis relative to the shaft axis.

11 Claims, 4 Drawing Sheets

FAN DRIVE GEAR SYSTEM INTEGRATED CARRIER AND TORQUE FRAME

BACKGROUND

This disclosure relates to a fan drive gear system integrated carrier and torque frame.

One type of gas turbine engine includes a fan drive gear system that is mechanically arranged between the turbo-machinery of the engine and a fan. The turbo-machinery is composed of two concentric shafts rotating at different speeds containing independent compressors and turbines. The turbo-machinery rotationally drives the fan, via the gear system, to move fluid through a nacelle which divides the fluid flow into two streams. An inner stream supplies the turbo-machinery and the outer stream consists of fluid which bypasses the inner stream and is solely compressed and moved by the fan.

Typically the fan drive gear system is provided by an epicyclic gear train and includes a centrally located input gear driven by the turbo-machinery, intermediate gears circumferentially arranged about and intermeshing with the input gear and a ring gear provided about and intermeshing the intermediate gears. Depending upon the configuration, either the intermediate gears or the ring gear rotationally drives the fan in response to rotation of the input gear.

The intermediate gears are typically supported in a carrier by a journal extending between spaced apart walls of the carrier. The carrier is typically constructed from a high strength metallic alloy such as steel, titanium or nickel. The carrier is bolted to a torque frame, which is secured to fixed structure or rotating structure depending upon the particular type of gear system.

One type of gear system for helicopter applications has been used which directly supports the intermediate gears on an integrated carrier and torque frame. This integrated torque frame includes shafts that directly support the intermediate gears in a cantilevered fashion by conventional rolling element bearings. This arrangement is subjected to vibrational stresses that may cause the integrated torque frame to fail.

SUMMARY

A fan gear drive system includes a torque frame having a base with integrated gear shafts circumferentially spaced relative to one another. Each shaft provides a shaft axis. A bearing assembly is mounted on each of the gear shafts and provides a bearing assembly. The bearing assembly includes a spherical bearing configured to permit angular movement of the bearing axis relative to the shaft axis.

A fan drive gear lubrication system includes a torque frame supporting multiple gears and having at least one lubrication passage. An oil baffle is secured to the torque frame and includes a central opening and multiple circumferentially spaced gear pockets arranged about the central opening that receive the multiple gears. The oil baffle includes at least one lubrication passageway in fluid communication with the lubrication passage.

A method of assembling a fan drive gear system includes the steps of installing a spherical bearing into a race to provide a bearing assembly. The bearing assembly is mounted onto a shaft or torque frame. A gear is installed onto the bearing assembly.

BRIEF DESCRIPTION OF THE DRAWINGS

The disclosure can be further understood by reference to the following detailed description when considered in connection with the accompanying drawings wherein.

DETAILED DESCRIPTION

Figure 1:
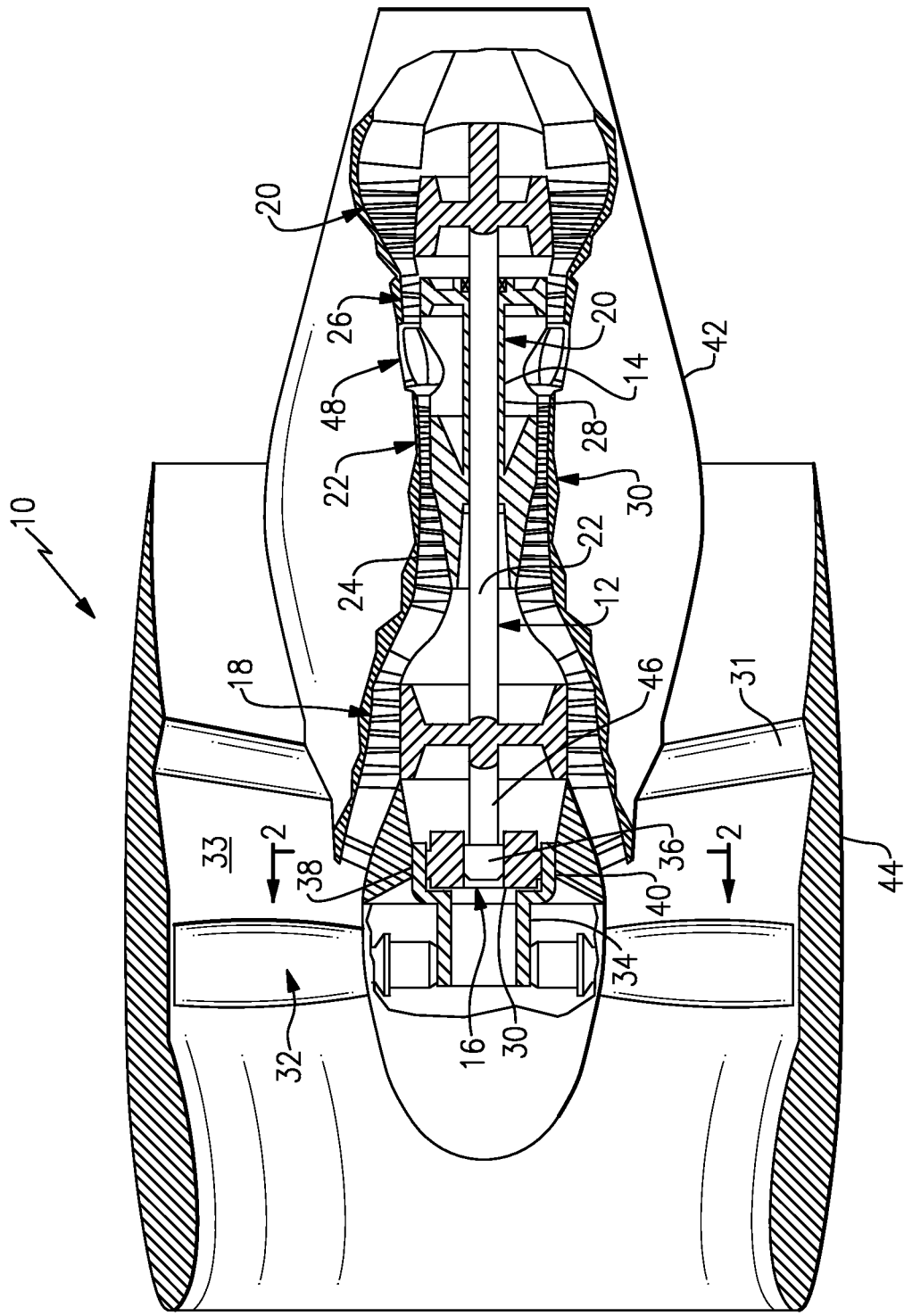
FIG. 1 is a schematic cross-sectional view of an example gas turbine engine.

An example gas turbine engine 10 is schematically illustrated in FIG. 1. The engine 10 includes turbo-machinery 30 having a compressor section 12 and a turbine section 14. The turbo-machinery 30 rotationally drives a fan 32, that is arranged in a bypass flow path 33, through an epicyclic gear train 16. The turbo-machinery 30 is housed within an inner nacelle 42. Flow exit guide vanes 31 arranged within the bypass flow path support the turbo-machinery 30 relative to a fan case, which is housed in a fan nacelle 44.

A low pressure compressor 18 and a low pressure turbine 20 are mounted on a low pressure spool 22. A high pressure compressor 24 and a high pressure turbine 26 are mounted on a high pressure spool 28. A combustor section 48 is arranged between the high pressure compressor 24 and the high pressure turbine 26.

The low pressure spool 22 rotationally drives a flex shaft 46 to which an input gear 36 (sun gear) is mounted for rotation about an axis A. Intermediate gears 38 (in the example, star gears) are arranged circumferentially about and intermesh with the input gear 36. A ring gear 40 surrounds and intermeshes with the intermediate gears 38. Either the intermediate gears 38 or the ring gear 40 rotationally drives the fan shaft 34 depending upon the type of epicyclic gear train configuration.

Figure 2:
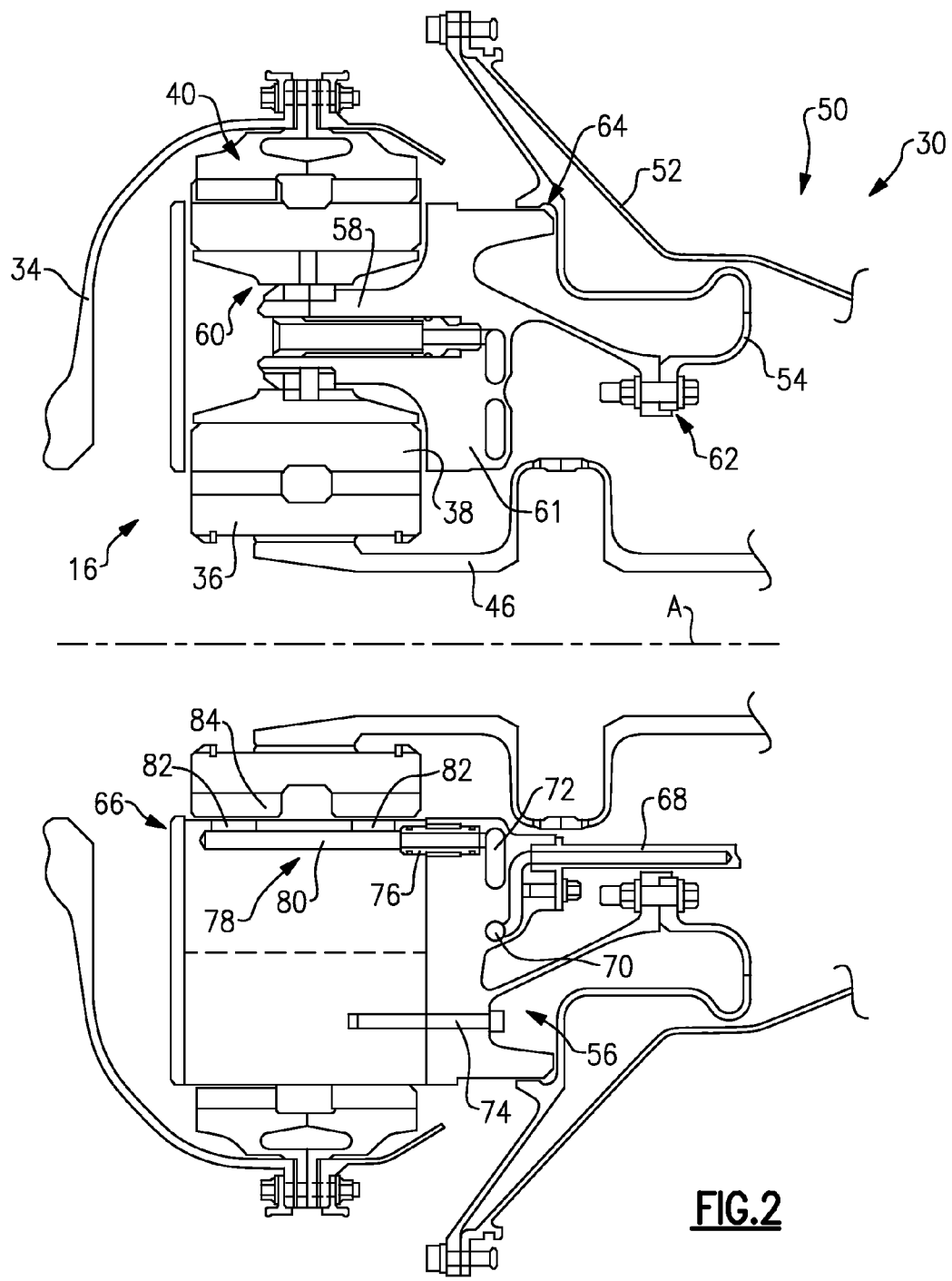
FIG. 2 is a cross-sectional view of an example fan drive gear system.

One example epicyclic gear train 16 is illustrated in FIG. 2. The epicyclic gear train 16 is the type in which the intermediate gears 38 (star gears, in the example) are rotationally fixed relative to the rotational axis of the input gear 36. That is, the star gears are permitted to rotate about their respective rotational axes but do not rotate about the rotational axis of the input gear 36. The ring gear 40 is coupled to the fan shaft 34 and to rotationally drive the fan 32. The turbo-machinery 30 includes fixed structure 50 comprising a bearing compartment case 52 and a support member 54. A torque frame 56 is affixed to the support member 54 to prevent rotation of the torque frame 56 about the rotational axis A of the input gear 36. However, it should be understood that in a planetary gear configuration the torque frame 56 would rotate about the rotational axis A and the ring gear would be coupled to fixed structure.

The torque frame 56 includes multiple shafts 58 integral with a base 61 that provides first and second support features 62, 64 affixed to the support member 54. In the example, the torque frame 56 includes five equally circumferentially spaced shafts 58 that correspondingly support five star gears. The base 61 and shafts 58 of the torque frame 56 are unitary and formed by a one-piece structure, for example, by a cast steel structure. Other high strength metallic alloys, such titanium or nickel, may also be used.

Each shaft 58 includes a bearing assembly 60 for rotationally supporting its respective intermediate gear 38. An oil baffle 66 is secured to the torque frame 56 by fasteners 74. The oil baffle 66 is non-structural. That is, the oil baffle does not support the loads of the intermediate gears 38 as would a prior art carrier. As a result, the oil baffle 66 may be constructed from a considerably lower strength lighter weight material, such as an aluminum alloy or composite material.

Both the torque frame 56 and the oil baffle 66 provide internal lubrication features for supplying lubricating fluid, such as oil, to the gears of the epicyclic gear train 16. As an example, a feed tube 68 supplies oil to first and second passages 70, 72 provided in the torque frame 56. A tube 76 fluidly interconnects the second passage 72 to a spray bar 78 provided integrally in the oil baffle 66. The spray bar 78 includes a first passageway 80, which extends in a generally axial direction in the example shown, and one or more second passageways 82 transverse to the first passageway 80. In the example, a pair of second passageways 82 are oriented to direct lubrication fluid radially inward at teeth 84 of the input gear 36.

Figure 3:
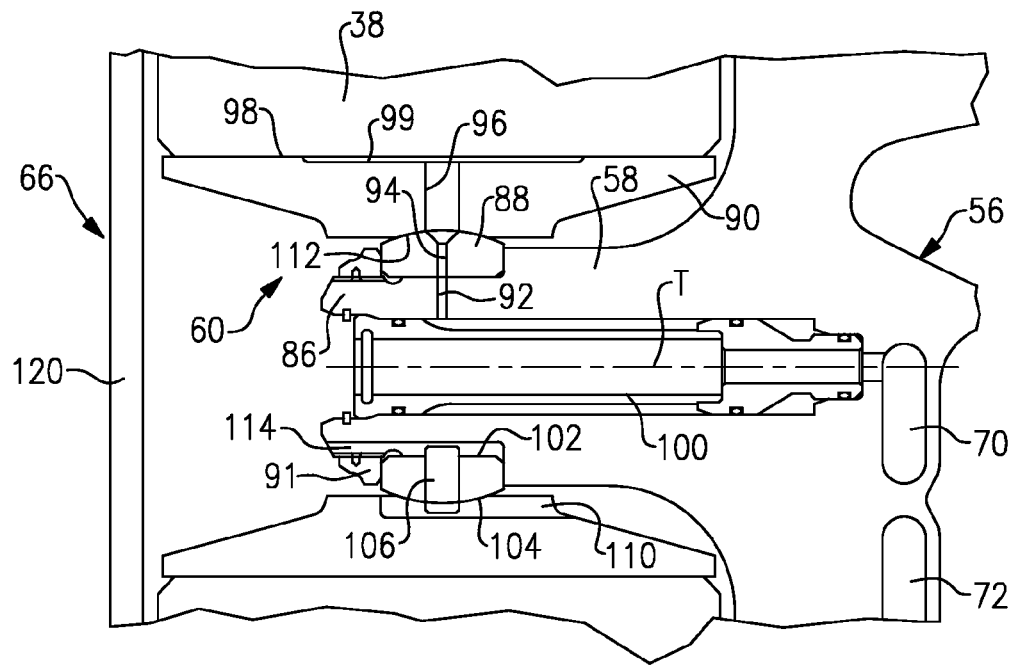
FIG. 3 is an enlarged cross-sectional view of a portion of the fan drive gear system illustrated in FIG. 2.

Referring to FIG. 3, each shaft 58 includes an end 86 that supports a bearing assembly 60. The bearing assembly 60 includes a spherical bearing 88 supported in a race 90 on which the intermediate gear 38 is mounted. The ends 86 include a threaded portion that each receives a nut 91 securing the bearing assembly 60 to the shaft 58. The shaft 58, spherical bearing 88 and race 90 respectively include radially extending first, second and third passageways 92, 94, 96 that are aligned with one another to deliver lubricating fluid from the first passage 70 to bearing surfaces 98 provided between the race 90 and the intermediate gear 38. A recess 99 is provided in an outer diameter of the race 90 to increase lubrication at the bearing surfaces 98. In one example, a filter 100 is arranged in a hole in the shaft 58 that provides a portion of the first passage 70.

Figure 5A:
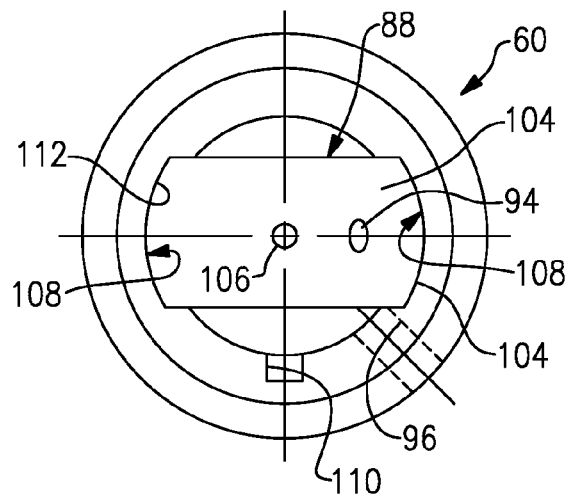
FIG. 5A is an elevational view of the spherical bearing of FIG. 4 inserted into a race in an assembly position.
Figure 5B:
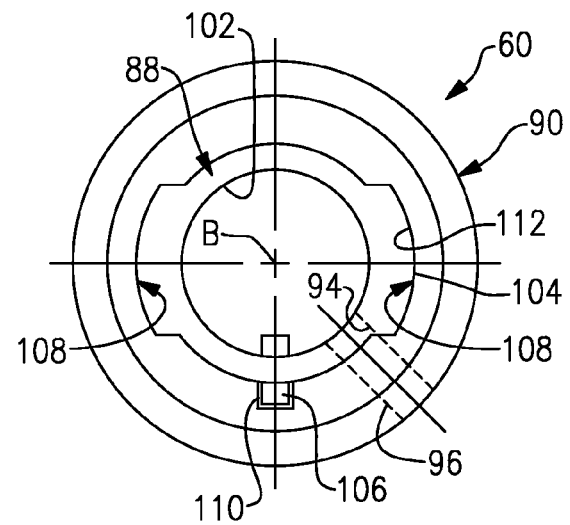
FIG. 5B is an elevational view of the spherical bearing of FIG. 4 fully assembled into the race to provide a bearing assembly.
Figure 4:
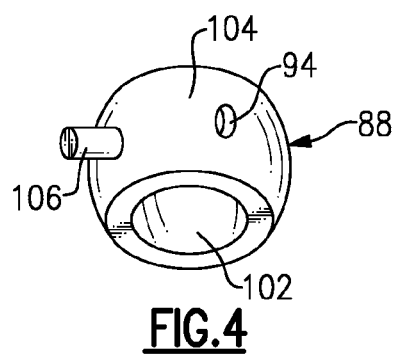
FIG. 4 is a perspective view of an example spherical bearing.

Referring to FIGS. 3-5B, the spherical bearing 88 includes an inner diameter 102 that is supported by the end 86. A convex surface 104 is provided on an outside of the spherical bearing 88 and mates with a corresponding concave surface 112 provided by an inner surface of the race 90 when fully assembled as illustrated in FIG. 5B. The spherical bearing 88 includes a pin 106 that extends through both the inner diameter 102 and the convex surface 104 in the example illustrated. The pin 106 is received by notches 110, 114 respectively provided in the race 90 and end 86 to prevent rotation of the spherical bearing 88 about a bearing axis B (FIG. 5B). The spherical bearing 88 permits angular movement of the bearing axis B relative to a shaft axis T (FIG. 3) provided by the shaft 58 during flexing of the shafts 58, which provides a near zero moment restraint.

FIGS. 5A and 5B illustrate the assembly process of the bearing assembly 60. The spherical bearing 88 is inserted into slots 108 of the race 90, as shown in FIG. 5A. The pin 106 is aligned with the notch 110 and the spherical bearing 88 is rotated to snap into engagement with the concave surface 112 with the pin 106 received in the notch 110. In this position, illustrated in FIG. 5B, the second and third passageways 94, 96 are aligned with one another.

Figure 6:
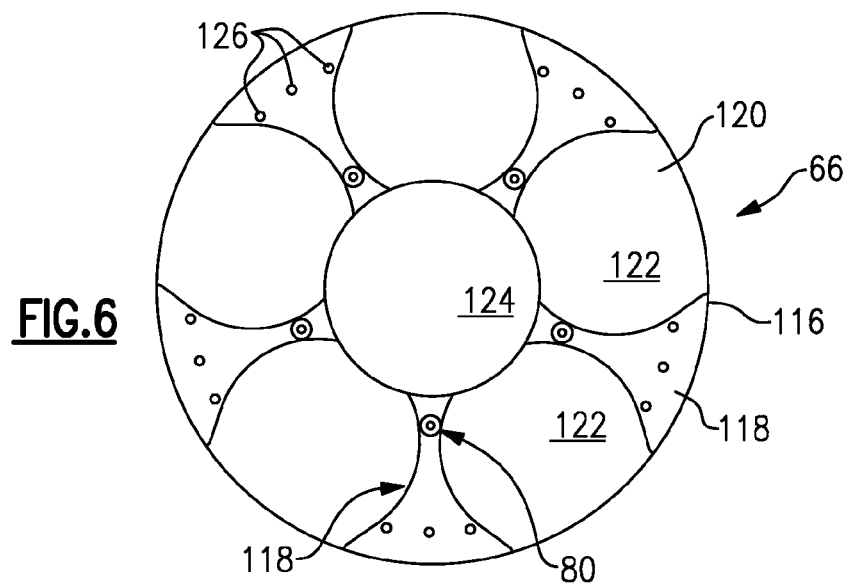
FIG. 6 is an elevational view of an example oil baffle used in the fan drive gear system and illustrated in FIGS. 2 and 3.

The oil baffle 66 is illustrated in more detail in FIG. 6. The oil baffle 66 is provided by a body 116 having circumferentially spaced apart intermediate structures 118 axially extending from a wall 120. The intermediate structures 118 define gear pockets 122 within which the intermediate gears 38 are received with the epicyclic gear train 16 fully assembled. The input gear 36 was received in a central opening 124 provided radially inward of the intermediate structures 118. Holes 126 are provided in the intermediate structures 118 and receive the fasteners 74 to secure the oil baffle 66 to the torque frame 56, as illustrated in FIG. 2.

Although an example embodiment has been disclosed, a worker of ordinary skill in this art would recognize that certain modifications would come within the scope of the claims. For that reason, the following claims should be studied to determine their true scope and content.

What is claimed is:

1. A fan gear drive system comprising:
    a torque frame comprising a base with integrated gear shafts circumferentially spaced relative to one another, each shaft providing a shaft axis;
    a bearing assembly mounted on each of the gear shafts and providing a bearing axis, the bearing assembly including a spherical bearing supported on the gear shaft and configured to permit angular movement of the bearing axis relative to the shaft axis, and a race mounted on the spherical bearing; and
    a gear supported for rotation about the bearing axis on a non-meshing support interface provided solely by the race the gear configured to slidingly rotate on and about the race.

2. The system according to claim 1, comprising a gear supported on each bearing assembly for rotation about the bearing axis, an input gear located radially inward from and intermeshing with intermediate gears supported on the gear shafts, and a ring gear arranged about and intermeshing with the intermediate gears, the input gear supported by an input shaft, and fixed structure supporting one of the ring gear and the torque frame, and the other of the ring gear and the torque frame coupled to a fan shaft.

3. The system according to claim 2, wherein the system is a star gear system in which the ring gear is coupled to the fan shaft and the torque frame is secured to the fixed structure.

4. The system according to claim 1, wherein a pin is configured to prevent relative rotation between the race, spherical bearing and the shaft about the shaft axis.

5. The system according to claim 1, wherein the torque frame includes an oil passage provided through the shaft and configured to provide lubricating fluid to the gears.

6. The system according to claim 5, wherein the bearing assembly includes at least one passageway extending through each of the spherical bearing and the race and in fluid communication with the passage.

7. The system according to claim 5, comprising an oil baffle supported by the torque frame and in fluid communication with the passage, a spray bar provided in the oil baffle and configured to direct lubricating fluid at teeth of at least one of the input gear and the intermediate gears.

8. The system according to claim 7, wherein the torque frame is constructed from a high strength metallic alloy, and the oil baffle is constructed from a lower strength lighter weight alloy than the high strength metallic alloy.

9. A fan drive gear drive lubrication system comprising:
    a torque frame supporting multiple gears and including at least one lubrication passage;
    an oil baffle secured to the torque frame and including a central opening and multiple circumferentially spaced gear pockets arranged about the central opening and receiving the multiple gears, the oil baffle including at least one lubrication passageway in fluid communication with the lubrication passage, wherein the torque frame includes a base with integrated gear shafts circumferentially spaced relative to one another and supporting the multiple gears;

wherein a bearing assembly is mounted on each gear shaft and includes a race receiving a spherical bearing, and at least one passageway extending through each of the spherical bearings, and the race and in fluid communication with the lubrication passage; and a gear supported for rotation about a bearing axis provided solely by the race, the gear configured to slidingly rotate on and about the race.

10. The system according to claim 9, wherein the at least one lubrication passageway includes a spray bar configured to direct lubricating fluid at teeth of a gear.

11. The system according to claim 9, wherein the torque frame is constructed from a high strength metallic alloy, and the oil baffle is constructed from a lower strength lighter weight alloy than the high strength metallic alloy.

* * * * *